(12) United States Patent
Okita

(10) Patent No.: US 8,271,582 B2
(45) Date of Patent: Sep. 18, 2012

(54) RELAY DEVICE, RELAY METHOD, AND COMPUTER PROGRAM PRODUCT

(75) Inventor: Kunio Okita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 150 days.

(21) Appl. No.: 12/825,825

(22) Filed: Jun. 29, 2010

(65) Prior Publication Data

US 2011/0004655 A1 Jan. 6, 2011

(30) Foreign Application Priority Data

Jul. 6, 2009 (JP) .................................. 2009-159899
Mar. 23, 2010 (JP) .................................. 2010-066703

(51) Int. Cl.
*G06F 15/16* (2006.01)
(52) U.S. Cl. ........ 709/203; 709/200; 455/411; 713/153; 713/170; 713/171; 713/150; 380/28; 380/30; 370/389; 370/346
(58) Field of Classification Search .................. 709/203, 709/211
See application file for complete search history.

(56) References Cited

U.S. PATENT DOCUMENTS

| | | | |
|---|---|---|---|
| 5,621,732 A * | 4/1997 | Osawa ........................... | 370/346 |
| 6,377,996 B1 | 4/2002 | Lumelsky et al. | |
| 6,457,047 B1 | 9/2002 | Chandra et al. | |
| 6,640,239 B1 | 10/2003 | Gidwani | |
| 2006/0133371 A1* | 6/2006 | Matoba ......................... | 370/389 |
| 2008/0005230 A1* | 1/2008 | Fujimaki ....................... | 709/203 |
| 2009/0055468 A1 | 2/2009 | Burckart et al. | |

FOREIGN PATENT DOCUMENTS

| | | |
|---|---|---|
| JP | 11-143759 | 5/1999 |
| JP | 4287900 | 2/2009 |

OTHER PUBLICATIONS

Dec. 6, 2011 European search report in connection with counterpart European patent application No. 10 25 1184.
Duvos, Enrique, et al. (2000), "An Infrastructure for the Dynamic Distribution of Web Applications and Services," pp. 1-22, Retrieved from the Internet: URL: http://dcommon.bu.edu/xmlui/handle/2144/1820.

* cited by examiner

*Primary Examiner* — Jude Jean Gilles
(74) *Attorney, Agent, or Firm* — Cooper & Dunham LLP

(57) ABSTRACT

A relay device includes a first communication unit that receives a request including processing object data from a client device; a data processing unit that obtains a first processing result by performing a relay-device-side process of equivalent algorithm to that of a server-side process, which is performed by a server, on the processing object data; a second communication unit that transmits the request to the server, and receives a second processing result, which corresponds to the first processing result and is obtained by performance of the server-side process on the processing object data, from the server as a response; and a control unit that determines whether the second processing result has been transmitted to the client device. When the second processing result has not been transmitted to the client device, the first communication unit transmits the first processing result to the client device.

20 Claims, 14 Drawing Sheets

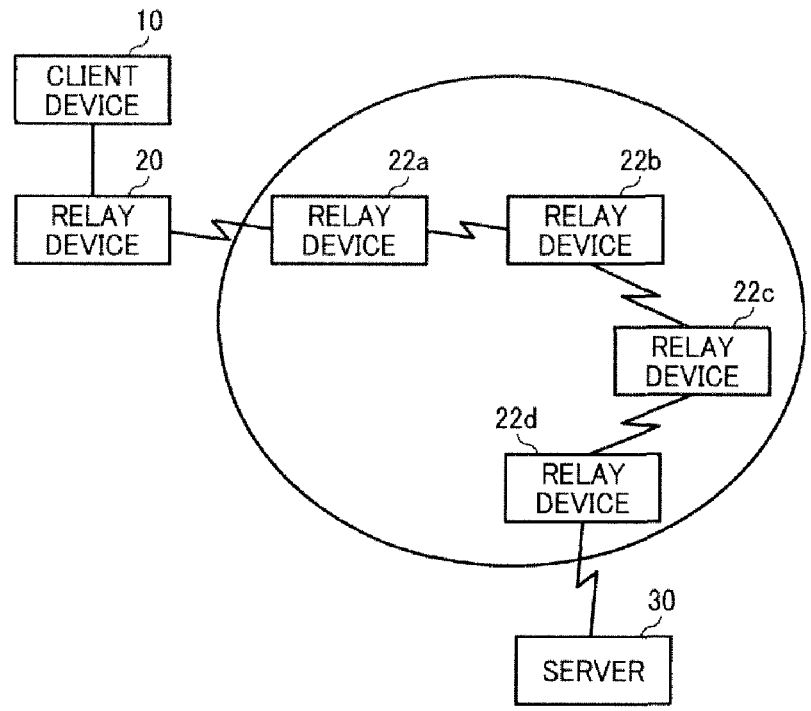
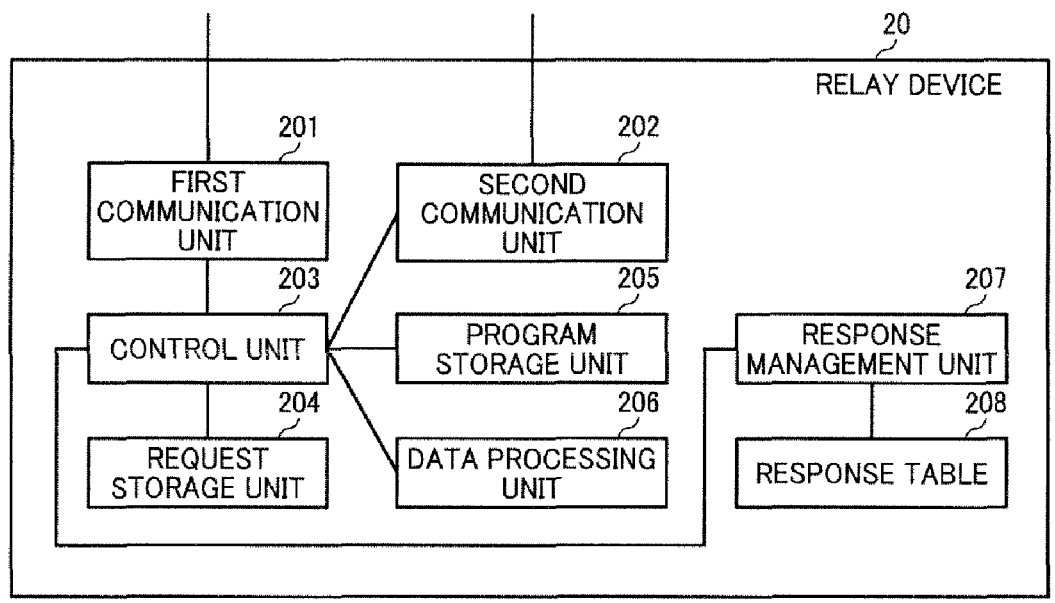

| SESSION ID | FIRST PROCESSING RESULT | SECOND PROCESSING RESULT |
|---|---|---|
| 855440f7e8 | 200 | – |
| bb3b1753b7 | 200 | |
| | | |

FIG. 10

EXAMPLE OF REQUEST

POST/HTTP/1.1
Host: www.example.com (MULTI-PAGE TIFF IMAGE DATA
COMPOSED OF 10 PAGES)

FIG. 11A

RESPONSE
(AT THE END OF PROCESS ON 1st PAGE)

HTTP/1.1 200 OK
Transfer-Encoding: chuncked 26
1st PAGE: INVOICE ON MARCH 31, 2009

FIG. 11B

RESPONSE
(AT THE END OF PROCESS ON 2nd PAGE)

11
2nd PAGE:

FIG. 12

RESPONSE FROM SERVER

> HTTP/1.1 200 OK
> Content-Length: 400
>
> 1st PAGE: INVOICE ON MARCH 31, 2009
> 2nd PAGE:
> 3rd PAGE: DESTINATION COMPANY X
> 4th PAGE: . . .
>    ⋮
> 10th PAGE: . . .

FIG. 13

RESPONSE (FINAL)

> HTTP/1.1 200 OK
> Transfer-Encoding: chuncked
> 159
> 3rd PAGE: DESTINATION COMPANY X
> 4th PAGE: . . .
>    ⋮
> 10th PAGE: . . .
>
> 0

REQUEST TRANSMITTED FROM RELAY DEVICE TO SERVER

POST/HTTP/1.1
Host: www.example.com
Expect: 2-10

(MULTI-PAGE TIFF IMAGE DATA COMPOSED OF 10 PAGES)

RELAY DEVICE, RELAY METHOD, AND COMPUTER PROGRAM PRODUCT

CROSS-REFERENCE TO RELATED APPLICATIONS

The present application claims priority to and incorporates by reference the entire contents of Japanese Patent Application No. 2009-159899 filed in Japan on Jul. 6, 2009 and Japanese Patent Application No. 2010-066703 filed in Japan on Mar. 23, 2010.

BACKGROUND OF THE INVENTION

1. Field of the Invention

The present invention relates to a relay device, a relay method, and a computer program product.

2. Description of the Related Art

In the era of SaaS (software as a service), it will become common to transmit large volumes of data via a network, process the data in a cloud across the network, and wait for a result of the data processing to be returned. However, network speed is a bottleneck, and a response time for a service, such as the reception of a processing result, may be long. There is data to show that a user's acceptable response time for a Web service is 4 seconds, so a system needs to return a response as quickly as possible. As a technology to meet such a need, it is well known that for example, like a cache of a proxy server, already-acquired data is stored in a relay device so as to quickly respond when targeted information is found in the cache.

Furthermore, Japanese Patent Application Laid-open No. H11-143759 discloses a proxy server cache system in which a proxy server, which includes a cache and is connected to a wide area network, is connected to one or more clients, which each include a cache and a World Wide Web browser operates therein, via a local area network. In this system, when data to be displayed on a World Wide Web browser of one client does not exist in the cache of the proxy server, the data can be retrieved from the cache of another client and displayed on the World Wide Web browser.

In a conventional caching mechanism of a proxy server as described above, it can be expected, for example, that the response speed with respect to a static file, such as an image file, is improved; however, the response speed of a processing result of large-volume data in a cloud cannot be expected to be improved. Furthermore, the same goes for the above-described system disclosed in Japanese Patent Application Laid-open No. H11-143759.

SUMMARY OF THE INVENTION

It is an object of the present invention to at least partially solve the problems in the conventional technology.

According to an aspect of the present invention, there is provided a relay device that is connected to a client device and a server via a network and functions as a relay between the client device and the server. The relay device includes a first communication unit that receives, from the client device via the network, a request including processing object data to be processed and destination information indicating the server; a data processing unit that obtains a first processing result by performing a relay-device-side process of equivalent algorithm to that of a server-side process on the processing object data, the server-side process being performed on the processing object data by the server; a second communication unit that transmits the request to the server, and receives a second processing result from the server as a response to the request, the second processing result corresponding to the first processing result and being obtained by performance of the server-side process on the processing object data; and a control unit that determines whether the second processing result has been transmitted to the client device. When it is determined that the second processing result has not been transmitted to the client device, the first communication unit transmits the first processing result to the client device as the response.

According to another aspect of the present invention, there is provided a relay method implemented by a relay device that is connected to a client device and a server via a network and functions as a relay between the client device and the server. The relay method includes receiving, from the client device via the network, a request including processing object data to be processed and destination information indicating the server; obtaining a first processing result by performing a relay-device-side process of equivalent algorithm to that of a server-side process on the processing object data, the server-side process being performed on the processing object data by the server; transmitting the request to the server and receiving a second processing result from the server as a response to the request, the second processing result corresponding to the first processing result and being obtained by performance of the server-side process on the processing object data; determining whether the second processing result has been transmitted to the client device; and transmitting the first processing result to the client device as the response when it is determined that the second processing result has not been transmitted to the client device.

According to still another aspect of the present invention, there is provided a computer program product that causes a computer, which functions as a relay between a client device and a server via a network, to perform the method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating a configuration of an entire relay system according to a first embodiment;

FIG. 2 is a block diagram illustrating a functional configuration of a relay device;

FIG. 10 is a diagram showing a request;

FIG. 11A is a diagram showing a response including a first processing result $R_1$;

FIG. 11B is a diagram showing a response including a first processing result $R_2$;

FIG. 12 is a diagram showing a response from the server;

FIG. 13 is a diagram showing a response to be transmitted to the client device;

DETAILED DESCRIPTION OF THE PREFERRED EMBODIMENTS

Figures 3, 4:
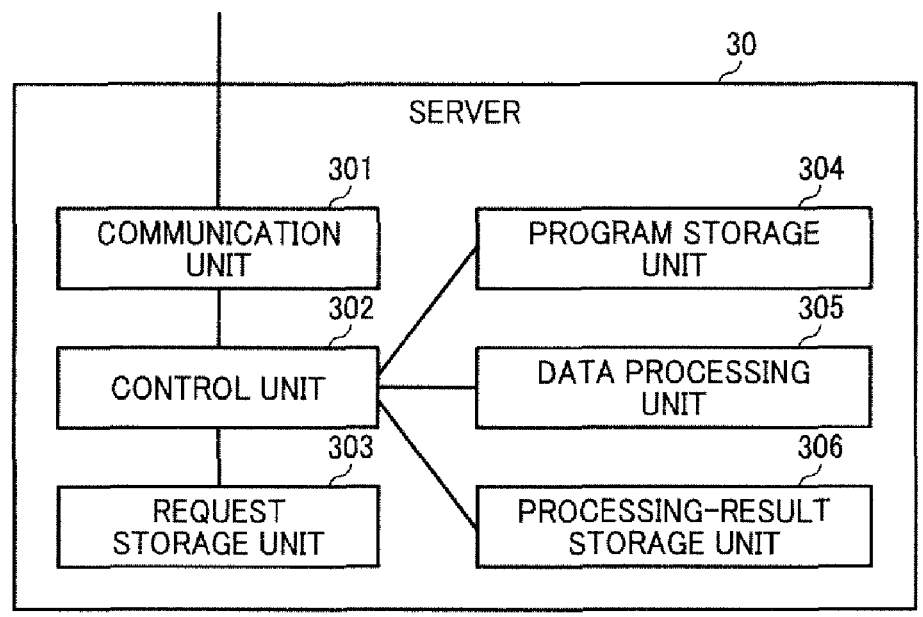
FIG. 3 is an explanatory diagram showing an example of data components of a response table.
FIG. 4 is a block diagram illustrating a functional configuration of a server.

Exemplary embodiments of a relay device, a relay method, and a program according to the present invention are explained in detail below with reference to the accompanying drawings.

First Embodiment

FIG. 1 is a diagram illustrating a configuration of an entire relay system according to a first embodiment of the present invention. The relay system includes a client device 10, relay devices 20 and 22a to 22d, and a server 30 that are connected via a network. The client device 10 and the relay device 20 are connected, for example, via a local area network (LAN). The relay device 20, the relay devices 22a to 22d, and the server 30 are connected, for example, via the Internet. The client device 10 is connected to the Internet via the relay device 20, and can access the server 30. Incidentally, the communication between the client device 10 and the server 30 is made via the four relay devices 22a to 22d in addition to the relay device 20. Incidentally, as another example, the client device 10 and the relay device 20 can be connected via the Internet.

In this manner, the communication between the client device 10 and the server 30 is made via the plurality of relay devices, so when the client device 10 transmits large-volume data via the network to cause the server 30 to process the data, it takes a long time for the client device 10 to get a processing result back from the server 30. Furthermore, for example, in a case where the client device 10 is installed in Japan and the server 30 is installed in America, it takes an especially long time to get a response. In the relay system according to the present embodiment, the relay device 20 takes charge of part of a process performed by the server 30, thereby getting a processing result back to the client device 10 in a shorter waiting time.

The relay device 20 here is, for example, a router, a hub, or the like, but not limited to these; the relay device 20 can be an average computer, such as a personal computer (PC). The server 30 here is a large-scale computer, a workstation, or the like.

The relay device 20 is inferior to the server 30 in processing capability. More specifically, for example, the relay device 20 is inferior to the server 30 in CPU power, which is expressed by a CPU clock frequency, etc.; for example, a CPU clock frequency of the relay device 20 is smaller than that of the server 30. Incidentally, the processing capability is not limited by a CPU clock frequency; whatever indicates the processing capability of the device is applicable.

FIG. 2 is a block diagram illustrating a functional configuration of the relay device 20. As shown in FIG. 2, the relay device 20 includes a first communication unit 201, a second communication unit 202, a control unit 203, a request storage unit 204, a program storage unit 205, a data processing unit 206, a response management unit 207, and a response table 208.

The first communication unit 201 transmits and receives data with the client device 10 via the LAN. For example, the first communication unit 201 receives a request to the server 30 from the client device 10, and transmits a response to the request to the client device 10. The request here includes data that one wants to process, i.e., processing object data as an object of a predetermined process, destination information indicating the server that performs the process on the processing object data, type-of-process information indicating a type of the process, and the like. The second communication unit 202 transmits and receives data with the server 30 via the Internet, the other relay devices 22a to 22d, and the like.

The control unit 203 controls the first communication unit 201 and the second communication unit 202, and manages data to be received and data to be transmitted. Furthermore, the control unit 203 specifies a next relay device to which the request is to be transferred on the basis of the destination information included in the request by reference to a routing table. The request storage unit 204 temporarily stores therein the request received from the client device 10. Incidentally, the request storage unit 204 is, for example, a main memory or the like.

The program storage unit 205 stores therein a program (a relay-device-side program) for processing the data received from the client device 10. The program stored in the program storage unit 205 is equivalent in algorithm (logic) to that of a program stored in the server 30 (a server-side program). Namely, the program storage unit 205 stores therein a program of equivalent algorithm to that of a program, which is normally to be executed on the side of the server 30 to achieve a function, so as to cause the relay device 20 to execute the program.

The program to be stored in the program storage unit 205 can be obtained from the server 30. Furthermore, the program storage unit 205 can store therein a plurality of programs. Incidentally, the programs of equivalent algorithm (logic) will be described in detail below.

The data processing unit 206 analyzes the request received from the client device 10, and retrieves a program corresponding to the request from the program storage unit 205 based on the type-of-process information, etc. included in the request. Then, the data processing unit 206 executes the retrieved program thereby performing a process (a relay-device-side process) on the processing object data, which is an object of the process.

Incidentally, the data processing unit 206 in the relay device 20 performs the process by executing the program of equivalent algorithm (logic) to that of the program of the server 30; however, the data processing unit 206 is inferior to the server 30 in processing capability because of a difference in CPU power between them as described above. A processing result obtained by the data processing unit 206 is transmitted to the client device 10 as a response to the request to the server 30.

The response management unit 207 manages the response to the request from the client device 10. When the response is returned to the client device 10, the response management unit 207 registers response history in the response table 208. The response table 208 is stored in a storage medium, such as a hard disk drive (HDD) or a memory.

FIG. 3 is an explanatory diagram showing an example of data components of the response table 208. When the first communication unit 201 receives a request, the response management unit 207 writes a session ID in the response table 208. The session ID is unique information for uniquely identifying a request and a response to the request. In the present embodiment, a session ID is generated based on, but not limited to, a request ID used for uniquely identifying a request.

When the data processing unit 206 performs the process with respect to the request, and the first communication unit 201 transmits a processing result obtained by the data processing unit 206 to the client device 10 as a response, the relay device 20 writes information for identifying the transmitted processing result on a column corresponding to the session ID. In the present embodiment, as the information for identifying the transmitted processing result, a byte count from the beginning of data, which is the processing result, is used, although it is not limited thereto.

Furthermore, as normal processing of the relay device, when the relay device receives, from the server 30, a processing result that is a response to the request, the response management unit 207 writes information for identifying the response, i.e., the processing result from the server 30 on a column corresponding to a session ID of the request received from the server 30.

Incidentally, in the example shown in FIG. 3, as information for identifying each processing result, a byte count from the beginning of data, each processing result, is stored. For example, as for a response identified by a session ID "855440f7e8", it shows that a portion of a processing result from the beginning up to 200 bytes has been transmitted to the client device 10 as a response.

Hereinafter, for convenience in description, a processing result obtained in the relay device 20 with respect to a request is referred to as a "first processing result", and a processing result obtained in the server 30 with respect to the request is referred to as a "second processing result". Since a program stored in the program storage unit 205 of the relay device 20 (a relay-device-side program) and a program stored in a program storage unit 304 of the server 30 (a server-side program) are equivalent in algorithm, a first processing result with respect to a request is identical to a second processing result corresponding to the first processing result, i.e., a second processing result with respect to the same request.

FIG. 4 is a block diagram illustrating a functional configuration of the server 30. As shown in FIG. 4, the server 30 includes a communication unit 301, a control unit 302, a request storage unit 303, the program storage unit 304, a data processing unit 305, and a processing-result storage unit 306.

The communication unit 301 transmits and receives data with the relay devices 22a to 22d and the like via the Internet. The control unit 302 controls the communication unit 301, and manages data to be received and data to be transmitted. The request storage unit 303 temporarily stores therein a request received by the communication unit 301. The request storage unit 303 is, for example, a main memory or the like.

The program storage unit 304 stores therein a program (a server-side program) for performing a process on processing object data included in a request on a function-by-function basis. A program for achieving a function, which is stored in the program storage unit 304, and a corresponding program stored in the program storage unit 205 of the relay device 20 are equivalent in algorithm (logic). Namely, the program storage unit 205 of the relay device 20 stores therein a program of equivalent algorithm to that of a program which is normally to be executed on the side of the server 30 so as to cause the relay device 20 to execute the program.

The equivalent algorithm (logic) here means that the process order of processing object data is the same and the same final processing result is produced at the completion of execution of the program. For example, let's say an OCR program for achieving an optical character reader (OCR) function is composed of a read command, an OCR command, and a transmit command.

In this example, the read command is a command to read scanned image data (or specified image data if an image-data file name or the like is specified by a parameter in the read command). The OCR command is a command to perform a character recognition process (an OCR process) on the data read in accordance with the read command sequentially from the beginning of the data and output, as a result of the OCR process, data of the image data that is recognized as a text (or store the data recognized as a text in a specified data file if a data file name or the like is specified by a parameter in the OCR command). The transmit command is a command to transmit the data recognized as a text, or the data stored as a result of the OCR process.

In this case, an OCR program of equivalent algorithm to that of the above OCR program just has to be the same process order, i.e., perform an OCR process on processing object data sequentially from the beginning and produce the same content of text data as an OCR processing result to be finally output, regardless of names of commands.

As long as the program stored in the program storage unit 304 of the server 30 and the program stored in the program storage unit 205 of the relay device 20 are equivalent in algorithm, i.e., are the same in process order and produce the same final processing result, the programs can differ in other conditions. For example, the program of the server 30 and the program of the relay device 20 can differ in processing unit of processing object data. Namely, as described above, the processing capability, such as CPU power, of the relay device 20 is lower than that of the server 30, so a processing unit of processing object data in the relay device 20 may be smaller than that of the server 30. Even in such a case, in the present embodiment, the relay device 20 can obtain the same processing result as when the server 30 executes a program by executing a program of equivalent algorithm to that of the program of the server 30, i.e., a program that is the same in process order as the program of the server 30 and produces the same final processing result as the program of the server 30.

Figure 5:
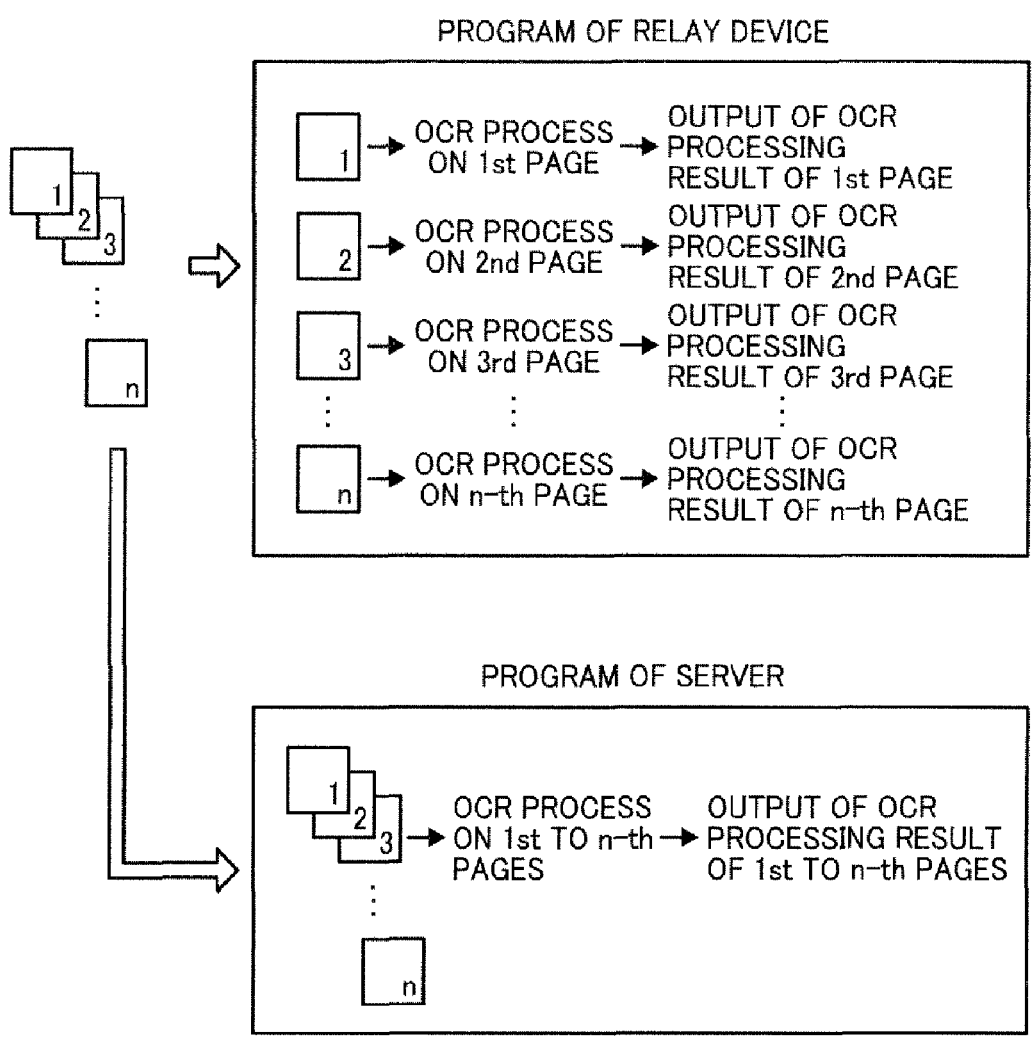
FIG. 5 is an explanatory diagram of a case where a processing unit differs between OCR programs of equivalent algorithm.

To take the above OCR program as an example, a processing unit of the OCR command can differ between the OCR program on the side of the relay device 20 and the OCR program on the side of the server 30. FIG. 5 is an explanatory diagram of a case where the processing unit of the OCR command differs between the OCR programs of equivalent algorithm.

As shown in FIG. 5, the OCR program of the relay device 20 causes the relay device 20 to divide image data (processing object data) which is composed of a plurality of pages into pieces of image data page by page, perform the OCR process on the image data on a per-page basis as a processing unit sequentially from the beginning of the image data, and transmit an OCR processing result as a response each time the per-page OCR process is completed; such a process is repeatedly performed until the last page of the image data is subjected to the OCR process, and an OCR processing result is transmitted on a per-page basis. In contrast, the OCR program of the server 30 causes the server 30 to perform the OCR process on a batch of multiple pages of image data (processing object data) which is composed of a plurality of pages on a multi-page basis as a processing unit sequentially from the beginning of the image data and transmit a multi-page OCR processing result as a response each time the multi-page OCR process is completed. In this case, in the OCR program of the relay device 20 and the OCR program of the server 30, the process order of the image data is the same, and content of whole text data transmitted, i.e., a final OCR processing result is the same. Consequently, the OCR program of the relay device 20 and the OCR program of the server 30 are equivalent in algorithm. However, the processing unit in the OCR program of the relay device 20 is a per-page basis, and the processing unit in the OCR program of the server 30 is a multi-page basis; therefore, the OCR program of the relay device 20 and the OCR program of the server 30 differ in processing unit.

As another example, it is assumed that the OCR program of the relay device 20 causes the relay device 20 to perform the OCR process on the image data on a per-line basis as a processing unit sequentially from the beginning of the image data and transmit an OCR processing result as a response each time the per-line OCR process is completed; such a process is repeatedly performed until the last line of the image data is subjected to the OCR process, and an OCR processing result is transmitted on a per-line basis. On the other hand, it is assumed that the OCR program of the server 30 causes the server 30 to perform the OCR process on the image data (processing object data) on a per-page basis as a processing unit sequentially from the beginning of the image data and transmit a per-page OCR processing result as a response each time the per-page OCR process is completed. Also in this case, in the same manner as in the above example, while the OCR program of the relay device 20 and the OCR program of the server 30 are equivalent in algorithm, the processing unit in the OCR program of the relay device 20 is a per-line basis, and the processing unit in the OCR program of the server 30 is a per-page basis; therefore, the OCR program of the relay device 20 and the OCR program of the server 30 differ in processing unit.

The data processing unit 305 executes a program stored in the program storage unit 304, thereby performing a process (a server-side process) on processing object data. The processing-result storage unit 306 stores therein a second processing result obtained by the data processing unit 305.

Figure 6:
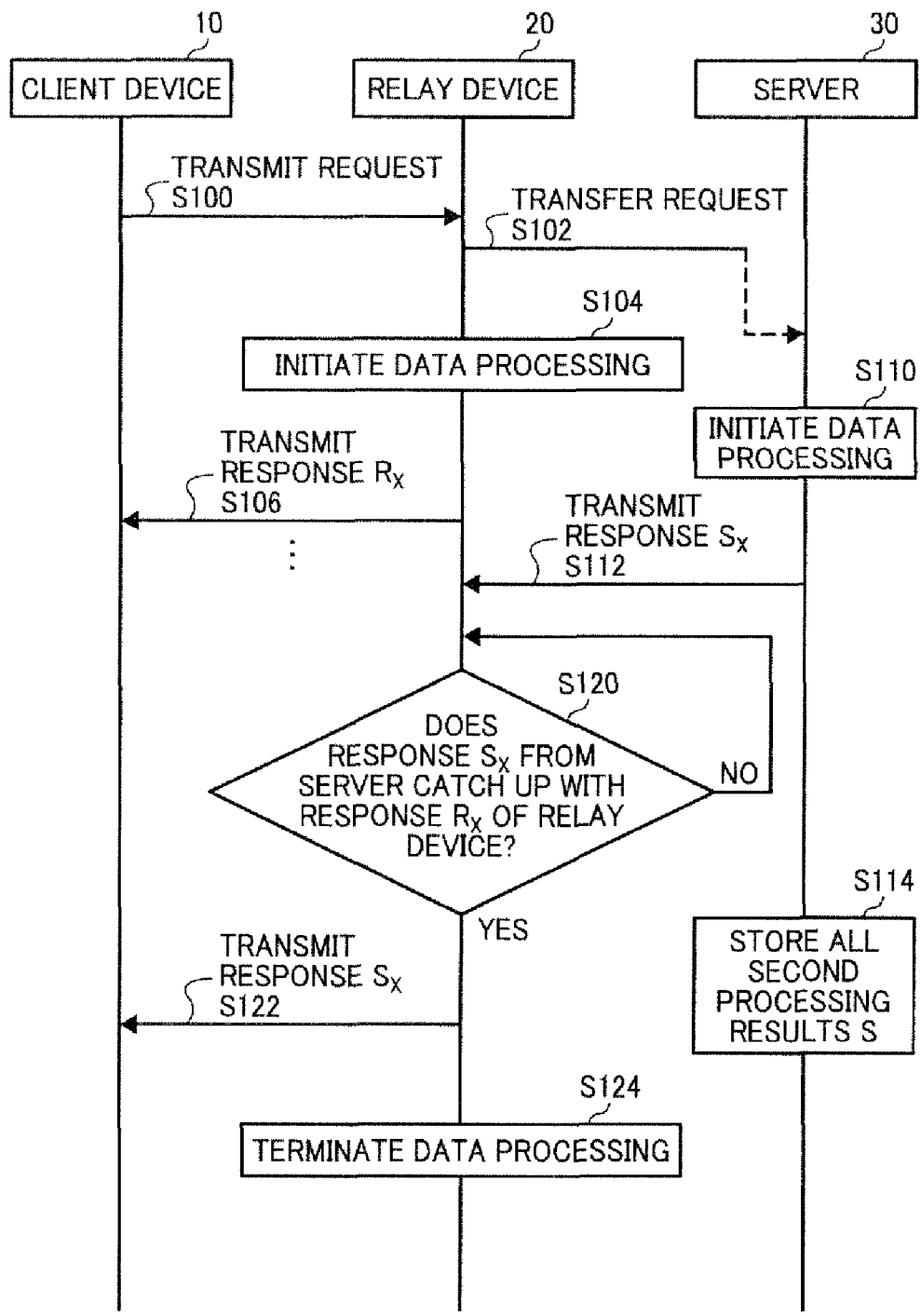
FIG. 6 is a communication sequence diagram illustrating a process performed when a client device transmits a request.

FIG. 6 is a communication sequence diagram illustrating a process performed when the client device 10 transmits a request. When the client device 10 transmits a request (Step S100), in the relay device 20, the first communication unit 201 receives the request transmitted from the client device 10, and the control unit 203 determines a next transfer destination of the request on the basis of destination information included in the request and the routing table that the control unit 203 includes. Then, under the control of the control unit 203, the second communication unit 202 transfers the request to the determined transfer destination (Step S102).

When the server 30 receives the request that has been transmitted from the client device 10 and transferred by the relay device 20, the server 30 temporarily stores the request in the request storage unit 303. Then, the data processing unit 305 retrieves a program corresponding to the request from the program storage unit 304 on the basis of type-of-process information, etc. included in the request, and initiates a process on processing object data, which is included in the request, using the retrieved program (Step S110). Then, when the process on a predetermined amount of the processing object data, such as one page of the data, is completed, i.e., when an enough result to return a response to the client device 10 is obtained, the server 30 transmits, as a response to the request, a second processing result $S_X$ (x=1, 2, ..., m) obtained by the data processing unit 305 to the relay device 20 via the communication unit 301 under the control of the control unit 302 (Step S112). When the server 30 initiates the data processing, the server 30 stores all second processing results S obtained by performing the process in the processing-result storage unit 306 (Step S114).

In the relay device 20, when the relay device 20 receives the request from the client device 10 (Step S100), the data processing unit 206 retrieves a program corresponding to the request from the program storage unit 205 on the basis of the type-of-process information, etc. included in the request, and initiates a process on the processing object data, which is included in the request, using the retrieved program (Step S104). Then, when the process on a predetermined amount of the processing object data, such as one page or one line of the data, is completed, the relay device 20 transmits, as a response, a first processing result $R_X$ (x=1, 2, ..., m) obtained by the data processing unit 206 to the client device 10 via the first communication unit 201 under the control of the control unit 203 (Step S106).

At this time, the response management unit 207 of the relay device 20 updates the response table 208 each time a response to the request is transmitted. Specifically, the response management unit 207 stores information for identifying the first processing result $R_X$ that has been transmitted to the client device 10 in the response table 208. Furthermore, also when the relay device 20 receives a response from the server 30 (Step S112), the response management unit 207 updates the response table 208. Specifically, the response management unit 207 stores information for identifying the second processing result $S_X$ that has been transmitted to the client device 10 in the response table 208.

The control unit 203 of the relay device 20 determines whether the first processing result $R_X$ identical to the second processing result $S_X$ received from the server 30 (the first processing result $R_X$ corresponding to the second processing result $S_X$) has been transmitted to the client device 10 as a response to the request by determining whether information for identifying the first processing result $R_X$ falling under a corresponding session ID has been registered in the response table 208 (Step S120). Namely, when information for identifying the first processing result $R_X$ falling under the corresponding session ID has not been registered in the response table 208, the control unit 203 determines that the first processing result $R_X$ identical to the second processing result $S_X$ has not yet been transmitted to the client device 10. On the other hand, when information for identifying the first processing result $R_X$ falling under the corresponding session ID has been registered in the response table 208, the control unit 203 determines that the first processing result $R_X$ identical to the second processing result $S_X$ has been transmitted to the client device 10.

Then, when it is determined that the first processing result $R_X$ identical to the second processing result $S_X$ received from the server 30 as a response to the request has not been transmitted to the client device 10, the control unit 203 of the relay device 20 determines that the response $S_X$ from the server 30 catches up with the response $R_X$ obtained by the relay device 20 (YES at Step S120), and since then, a response $S_X$ received from the server 30 is transmitted to the client device 10 (Step S122). Then, the data processing by the data processing unit 206 is terminated (Step S124).

Figure 7:
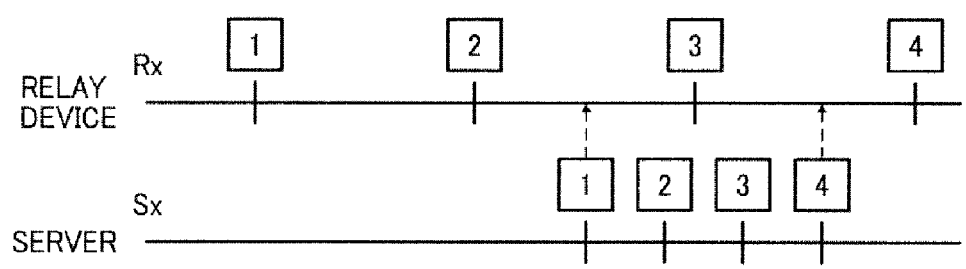
FIG. 7 is a diagram for explaining processes performed by the relay device and the server.

The above process is specifically explained with reference to FIGS. 7 and 8. As shown in FIG. 7, when the relay device 20 receives a request from the client device 10, the relay device 20 can immediately initiate a process. Therefore, the relay device 20 can return a first response at an earlier time than the server.

In an example shown in FIG. 7, after first processing results $R_1$ and $R_2$ have been transmitted to the client device 10 by the relay device, a second processing result $S_1$ from the server 30, which is identical to the first processing result $R_1$, arrives on the relay device 20. In this case, the second processing result $S_1$ is deleted. Similarly, second processing results $S_2$ and $S_3$ are also deleted. Then, when a second processing result $S_4$ arrives on the relay device 20, a first processing result $R_4$ identical to the second processing result $S_4$ has not yet been obtained in the relay device 20. This means the response from the server 30 catches up with the response of the relay device 20 at this time. In this case, the relay device 20 transmits the second processing result $S_4$ received from the server 30 to the client device 10 as a response. And, the relay device 20 terminates the process by the data processing unit 206.

Figure 8:
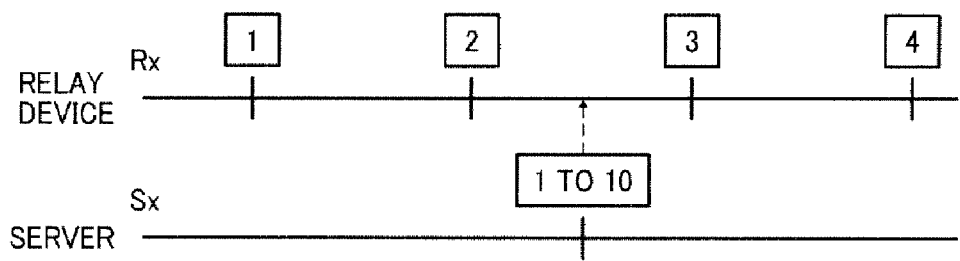
FIG. 8 is a diagram for explaining another example of the processes performed by the relay device and the server.

In an example shown in FIG. 8, the relay device 20 returns a response on a per-page basis of processing object data, and the server 30 returns a response with whole processing object data as a unit. Incidentally, the processing object data is composed of 10 pages. At a time when the relay device 20 has transmitted, as a response, first processing results $R_1$ and $R_2$ to the client device 10 but not yet transmitted a first processing result $R_3$, when the relay device 20 receives, as a response, a second processing result S ($S_1$ to $S_{10}$) from the server 30, the relay device 20 deletes the second processing results $S_1$ and $S_2$ identical to the first processing results $R_1$ and $R_2$, which have already been transmitted to the client device 10, out of the second processing results $S_1$ to $S_{10}$ included in the response received from the server 30, and transmits the second processing results $S_3$ to $S_{10}$ to the client device 10 as a response.

In this manner, in the present embodiment, the relay device 20 can return a response to the client device 10 before the relay device 20 receives a response from the server 30. Namely, when the relay device 20 according to the present embodiment receives a request from the client device 10, the relay device 20 executes a program of equivalent algorithm to that of a program for a process, which is normally to be executed on the side of the server 30, in parallel with the server 30, and transmits a processing result obtained by performing a process on its own to the client device 10 as a response to the request on behalf of the server 30. Furthermore, the relay device 20 executes a program that is equivalent in algorithm to that of a program for a process which is normally to be executed on the side of the server 30 but differs in processing unit from the program on the side of the server 30.

Figure 9:
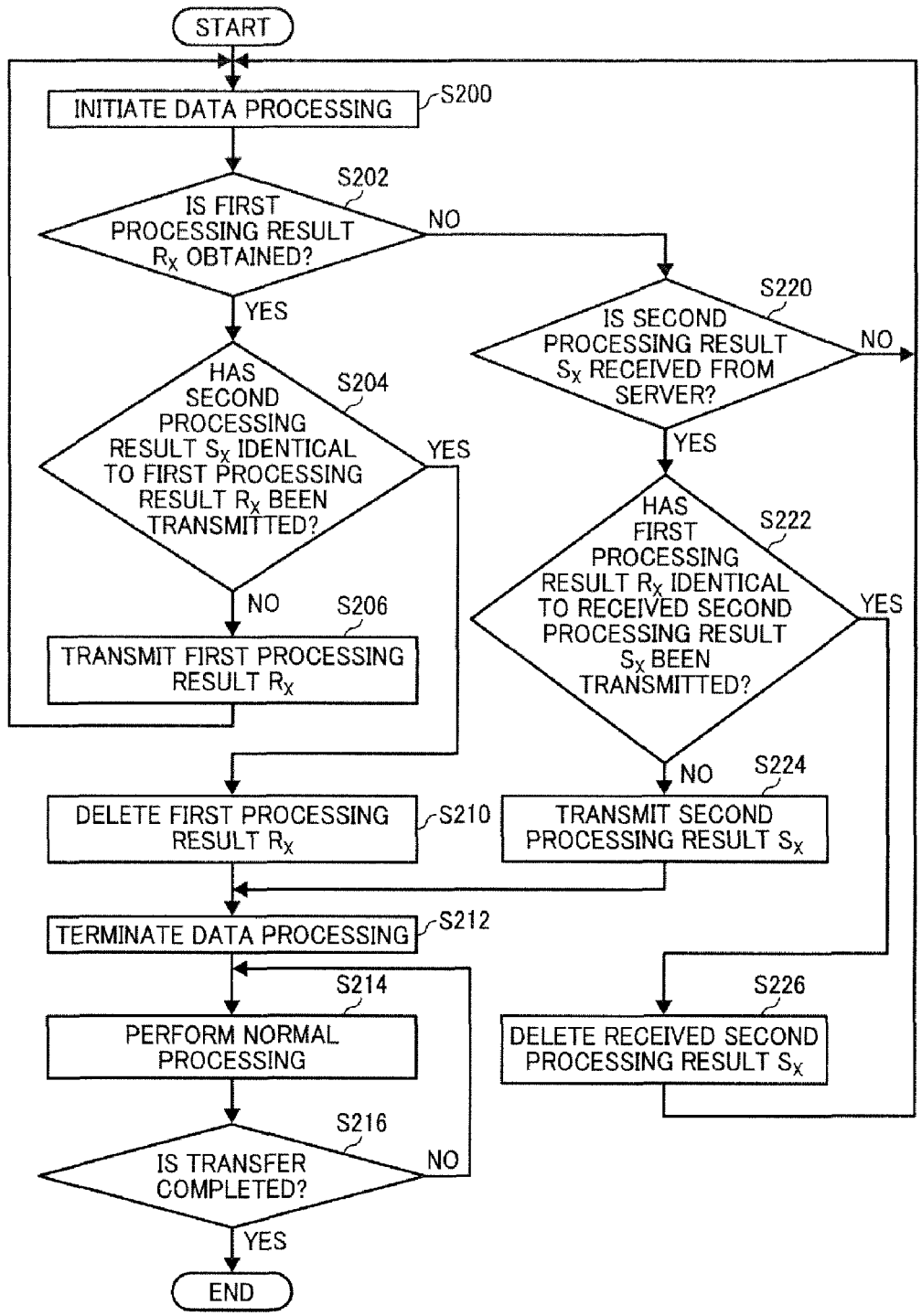
FIG. 9 is a flowchart illustrating a detailed procedure of a process performed by the relay device after initiation of data processing.

FIG. 9 is a flowchart illustrating a detailed procedure of a process performed by the relay device 20 after initiation of data processing. A process for controlling either a first processing result $R_X$ or a second processing result $S_X$ to be transmitted as a response being transmitted to the client device 10 is explained with reference to FIG. 9. Incidentally, FIG. 9 shows a process in one session; as for processes in the other sessions, the process shown in FIG. 9 is performed individually session by session.

In the relay device 20, when the data processing unit 206 initiates a process on processing object data included in a request (Step S200), the control unit 203 monitors whether a first processing result $R_X$, which is a processing result in a unit transmittable as a response to the request, is obtained (Step S202). When a first processing result $R_X$ is obtained (YES at Step S202), the control unit 203 further determines whether a second processing result $S_X$, which is identical to the first processing result $R_X$ identified at Step S202, has been already received from the server 30 and transmitted to the client device 10 (Step S204).

When the second processing result $S_X$ has been transmitted to the client device 10, information indicating the second processing result $S_X$ has been written in the response table 208. Therefore, whether the second processing result $S_X$ has already been transmitted or not can be determined by the presence or absence of the information indicating the second processing result $S_X$.

When the second processing result $S_X$ has not yet been transmitted (NO at Step S204), under the control of the control unit 203, the first communication unit 201 transmits the first processing result $R_X$ to the client device 10 as a response (Step S206), and the process returns to Step S200. At this time, the response management unit 207 writes information indicating the first processing result $R_X$ in the response table 208. Namely, the response management unit 207 updates the response table 208. Consequently, the relay device 20 can return the response to the client device 10 before receiving the second processing result $S_X$ from the server 30.

At Step S204, when the second processing result $S_X$ has already been transmitted to the client device 10 (YES at Step S204), the control unit 203 deletes the first processing result $R_X$ (Step S210). Incidentally, the second processing result $S_X$ has been transmitted to the client device 10, which means that the response from the server 30 catches up with the response of the relay device 20. Therefore, in this case, the process by the data processing unit 206, i.e., the process performed by executing a program on behalf of the server 30 in this session is terminated (Step S212). In other words, in the case where the individual process is performed in each of a plurality of different sessions, the data processing only in the present session is terminated. Consequently, the processing result identical to the second processing result $S_X$ obtained by the server 30 can be prevented from being transmitted to the client device 10 redundantly. Furthermore, by the termination of the process by the data processing unit 206, an unnecessary processing load on the relay device 20 can be reduced.

Since then, the relay device 20 performs a process as normal, i.e., transmits a response received from the server 30 to the client device 10 (Step S214). When the transfer of all the responses to the client device 10 is completed (YES at Step S216), the session is terminated, and the process is completed.

Furthermore, after the initiation of data processing (Step S200), when a second processing result $S_X$ is obtained from the server 30 (NO at Step S202, YES at Step S220), the control unit 203 determines whether a first processing result $R_X$ identical to the second processing result $S_X$ received from the server 30 has already been transmitted to the client device 10 by reference to the response table 208 (Step S222). When the first processing result $R_X$ has been transmitted to the client device 10, information indicating the first processing result $R_X$ has been written in the response table 208. Therefore, whether the first processing result $R_X$ has already been transmitted or not can be determined by the presence or absence of the information indicating the first processing result $R_X$.

When the first processing result $R_X$ has not yet been transmitted to the client device 10 (NO at Step S222), under the control of the control unit 203, the first communication unit 201 transmits the second processing result $S_X$ to the client device 10 as a response (Step S224).

At this time, the response management unit 207 writes information indicating the second processing result $S_X$ in the response table 208. Namely, the response management unit 207 updates the response table 208. In this manner, the second processing result $S_X$ has been transmitted to the client device 10, which means that the response from the server 30 catches up with the response of the relay device 20. Therefore, in this case, the process proceeds to Step S212, and the process by the data processing unit 206 is terminated.

At Step S222, if the first processing result $R_X$, which is identical to the second processing result $S_X$ received from the server 30, has already been transmitted to the client device 10 (YES at Step S222), the control unit 203 deletes the second processing result $S_X$ received from the server 30 (Step S226), and the process returns to Step S200.

As described above, the relay device 20 manages a processing result that has been transmitted to the client device 10 using the response table 208; therefore, the relay device 20 can transmit a processing result obtained by the relay device 20 or the server 30 to the client device 10 properly without transmitting the same processing result to the client device 10 redundantly.

Incidentally, for example, when the normal process (Step S214) is initiated, there is no need to manage a processing result obtained by the relay device 20 and a processing result obtained by the server 30. Consequently, the response management unit 207 can delete corresponding data from the response table at this time. By doing this, the memory can be effectively utilized.

Subsequently, there is described a case where a request to obtain an OCR processing result of all pages of a multi-page TIFF image data, which is composed of 10 pages, using a HyperText Transfer Protocol (HTTP) is transmitted. FIG. 10 is a diagram showing the request in this case.

The relay device 20 receives a request as shown in FIG. 10 from the client device 10. The control unit 203 of the relay device 20 specifies a program to be used for a process on the basis of information included in Request-Line and Host-Header of the request, retrieves the corresponding program from the program storage unit 205, and causes data processing to be initiated. In the present example, a program causing the relay device 20 to perform the OCR process on all pages of the multi-page TIFF image data on a per-page basis is retrieved.

The data processing unit 206 first performs the OCR process on the first page of the multi-page TIFF image data, and obtains a first processing result $R_1$ "Invoice on Mar. 31, 2009". When the first processing result $R_1$ is obtained, the control unit 203 transmits the first processing result $R_1$ to the client device 10 as a response. FIG. 11A is a diagram showing the response including the first processing result $R_1$. In this manner, the response includes the first processing result $R_1$ obtained by the data processing unit 206. At the time of return of the first page response, the response management unit 207 writes information indicating the first processing result $R_1$, specifically, information indicating that 0x26 bytes of data has been transmitted as a response in the response table 208.

Then, a result of the OCR process on the second page, i.e., a first processing result $R_2$ is obtained by the data processing unit 206. In the present example, text data is not obtained from the second page. The control unit 203 transmits the first processing result $R_2$ to the client device 10 as a response. FIG. 11B is a diagram showing the response including the first processing result $R_2$. In this manner, the response includes the first processing result $R_2$. Incidentally, the response shown in FIG. 11B is returned in the same session as the response shown in FIG. 11A, so the response shown in FIG. 11B requires no header. Furthermore, as another example, the first processing result $R_2$ can be transmitted to the client device 10 in a manner that adds to the already-transmitted response.

At the time of return of the second page response, the response management unit 207 writes information indicating that the first processing result $R_2$ has been transmitted in the response table 208. Specifically, the response management unit 207 writes information indicating that 0x37 bytes of data, which is the total of the processing results of the first and second pages, has been transmitted as a response in the response table 208.

In the present example, it is assumed that a response is returned from the server 30 before the data processing unit 206 performs the process on the third page. Furthermore, in the present example, the server 30 returns not a chunk of responses but all responses to the request at one time. FIG. 12 is a diagram showing the response from the server 30. In this manner, the response from the server 30 includes respective second processing results $S_1$ to $S_{10}$ with respect to all the 10 pages of processing object data. When receiving all the responses in this manner, the relay device 20 needs not perform a process for determining whether the response from the server 30 catches up with the response of the relay device 20, and the control unit 203 terminates the process by the data processing unit 206.

Then, the control unit 203 deletes data identical to the already-stored 0x37-byte data from the body of the response received from the server 30 by reference to the response table 208. In other words, the second processing results $S_1$ and $S_2$ with respect to the first and second pages are deleted. Furthermore, the control unit 203 adds "0" indicating the end of the session into the bottom of the response. Then, under the control of the control unit 203, the first communication unit 201 transmits the edited response to the client device 10. FIG. 13 is a diagram showing the response to be transmitted to the client device 10. In this manner, the second processing results $S_1$ and $S_2$ identical to the already-transmitted first processing results $R_1$ and $R_2$ are deleted from the response, and only the second processing results $S_3$ to $S_{10}$, which are processing results of the third to tenth pages, are included in the response.

As described above, when the relay device 20 according to the present embodiment receives a request from the client device 10, the relay device 20 executes a program of equivalent algorithm to that of a program which is normally to be executed on the side of the server 30 in parallel with the server 30. Then, when the relay device 20 obtains a processing result from the execution of the program on the side of the relay device 20 before receiving a response that is a processing result from the execution of the program by the server 30, from the server 30, the relay device 20 can transmit, as a response to the request, the processing result obtained by the execution of the program on the side of the relay device 20 to the client device 10 on behalf of the server 30 without waiting for the response from the server 30. Consequently, according to the present embodiment, even when the communication speed between the client device, the relay devices 20, 22a, 22b, 22c, and 22d, and the server 30 is slow due to a network environment, it is possible to reduce a waiting time for the client device 10 to receive a response to a request as compared with a case where the client device 10 receives a response from the server 30 only.

Furthermore, the relay device 20 according to the present embodiment executes a program that is equivalent in algorithm to that of a program which is normally to be executed on the side of the server 30 but differs in processing unit from the program on the side of the server 30. Consequently, according to the present embodiment, even when the processing capability, such as CPU power, of the relay device 20 is lower than that of the server 30, the relay device 20 can obtain the same processing result as the server 30 and transmit it to the client device 10 without increasing the processing time on the side of the relay device 20.

Second Embodiment

In a second embodiment, a range to be subjected to a process by a relay device, i.e., a first range is set in advance, and the relay device performs the process on only the first range of processing object data. The relay device according to the second embodiment differs in this respect from the relay device 20 according to the first embodiment.

Figure 14:
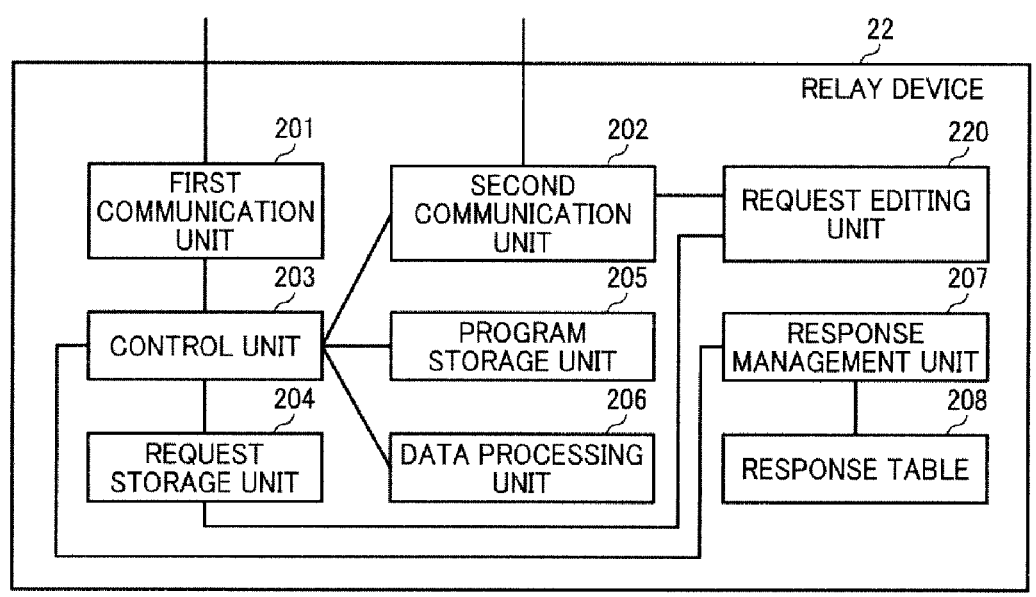
FIG. 14 is a block diagram illustrating a functional configuration of a relay device according to a second embodiment.

FIG. 14 is a block diagram illustrating a functional configuration of a relay device 22 according to the second embodiment. As shown in FIG. 14, the relay device 22 according to the second embodiment includes the first communication unit 201, the second communication unit 202, the control unit 203, the request storage unit 204, the program storage unit 205, the data processing unit 206, the response management unit 207, a request editing unit 220, and the response table 208. The first communication unit 201, the second communication unit 202, the request storage unit 204, the program storage unit 205, the data processing unit 206, the response management unit 207, and the response table 208 included in the relay device 22 are identical to those in the relay device 20 for the first embodiment.

The request editing unit 220 deletes a first range from processing object data, which is included in a request received by the first communication unit 201, and temporarily stores the request from which the first range is deleted in the request storage unit 204. The first range here is a predetermined range, such as one page. As another example, only if the whole processing object data is composed of more than 5 pages, one-page data can be deleted as the first range. Furthermore, as still another example, the first range can be set by a percentage of the whole processing object data, such as 10% of the total.

The control unit 203 retrieves the request including a second range of the processing object data, which is a range of the processing object data other than the first range, from the request storage unit 204, and under the control of the control unit 203, the second communication unit 202 transmits the retrieved request to the server 30 which is a destination. Therefore, the server 30 receives only the second range of the processing object data, and performs a process on the second range of the processing object data, and then returns a response.

Figure 15:
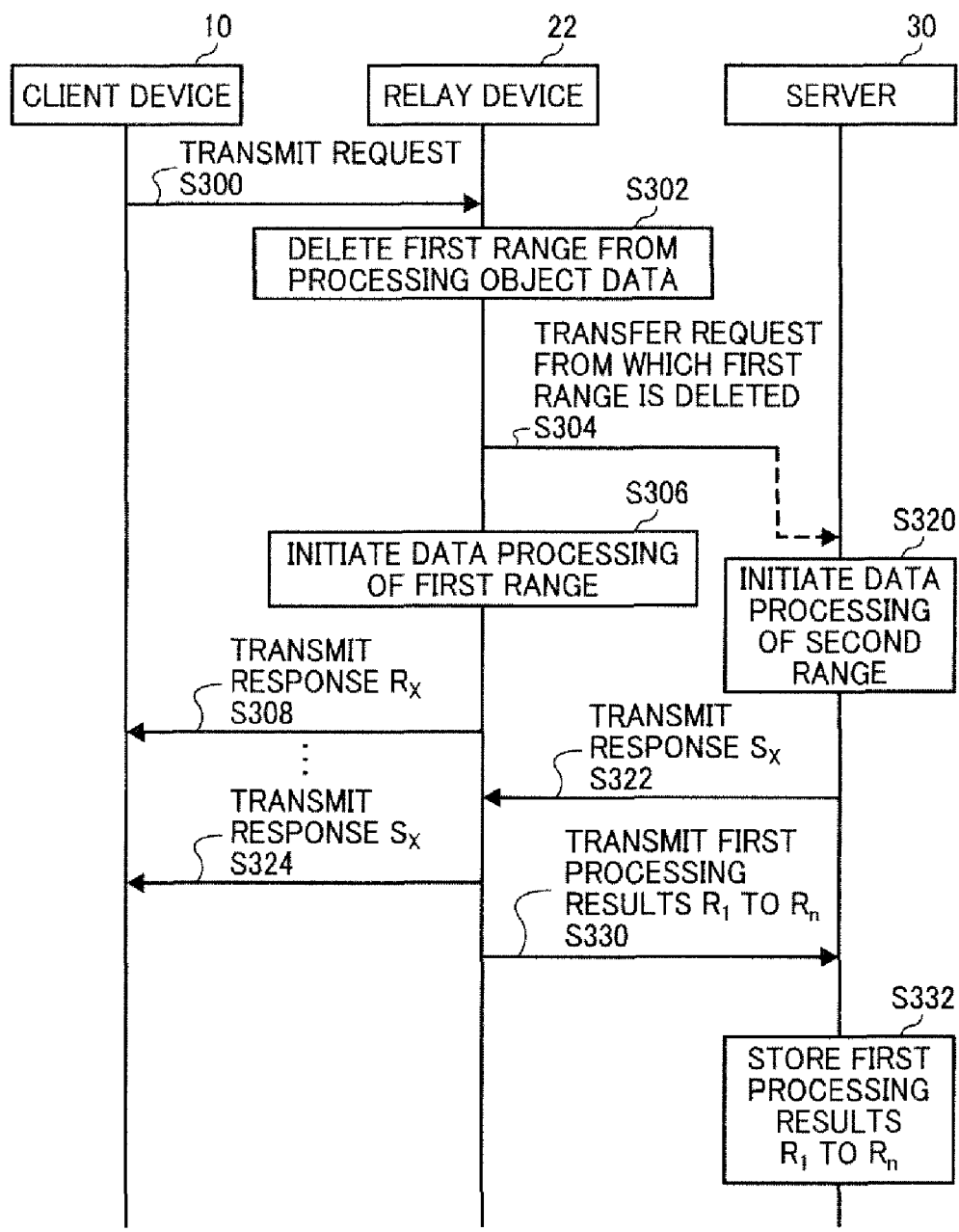
FIG. 15 is a communication sequence diagram illustrating a process according to the second embodiment.

FIG. 15 is a communication sequence diagram illustrating a process according to the second embodiment. When the client device 10 transmits a request (Step S300), the first communication unit 201 of the relay device 22 receives the request from the client device 10. Then, the control unit 203 of the relay device 22 allows the deletion of a first range from processing object data included in the received request (Step S302). The request from which the first range is deleted is stored in the request storage unit 204 by the request editing unit 220, and retrieved by the control unit 203. Then, under the control of the control unit 203, the second communication unit 202 transfers the request including the processing object data from which the first range is deleted to the server 30 (Step S304). In the server 30, a process on a second range of the processing object data is initiated (Step S320).

Then, when a second processing result $S_X$ is obtained, the server 30 transmits the second processing result $S_X$ to the client device 10 as a response to the request (Step S322). On the other hand, in the relay device 22, when the relay device 22 receives the request, the data processing unit 206 initiates a process on the first range of the processing object data (Step S306). Then, when a first processing result $R_X$ is obtained, the relay device 22 transmits the first processing result $R_X$ to the client device 10 as a response to the request (Step S308).

When the transmission of the first processing result $R_X$ with respect to the first range is completed, the relay device 22 transmits the second processing result $S_X$ received from the server 30 to the client device 10 as the response (Step S324). Furthermore, the relay device 22 transmits the first processing results $R_1$ to $R_n$ with respect to the first range to the server 30 (Step S330), and the first processing results $R_1$ to $R_n$ are stored in the processing-result storage unit 306 of the server 30 (Step S332).

Figure 16:
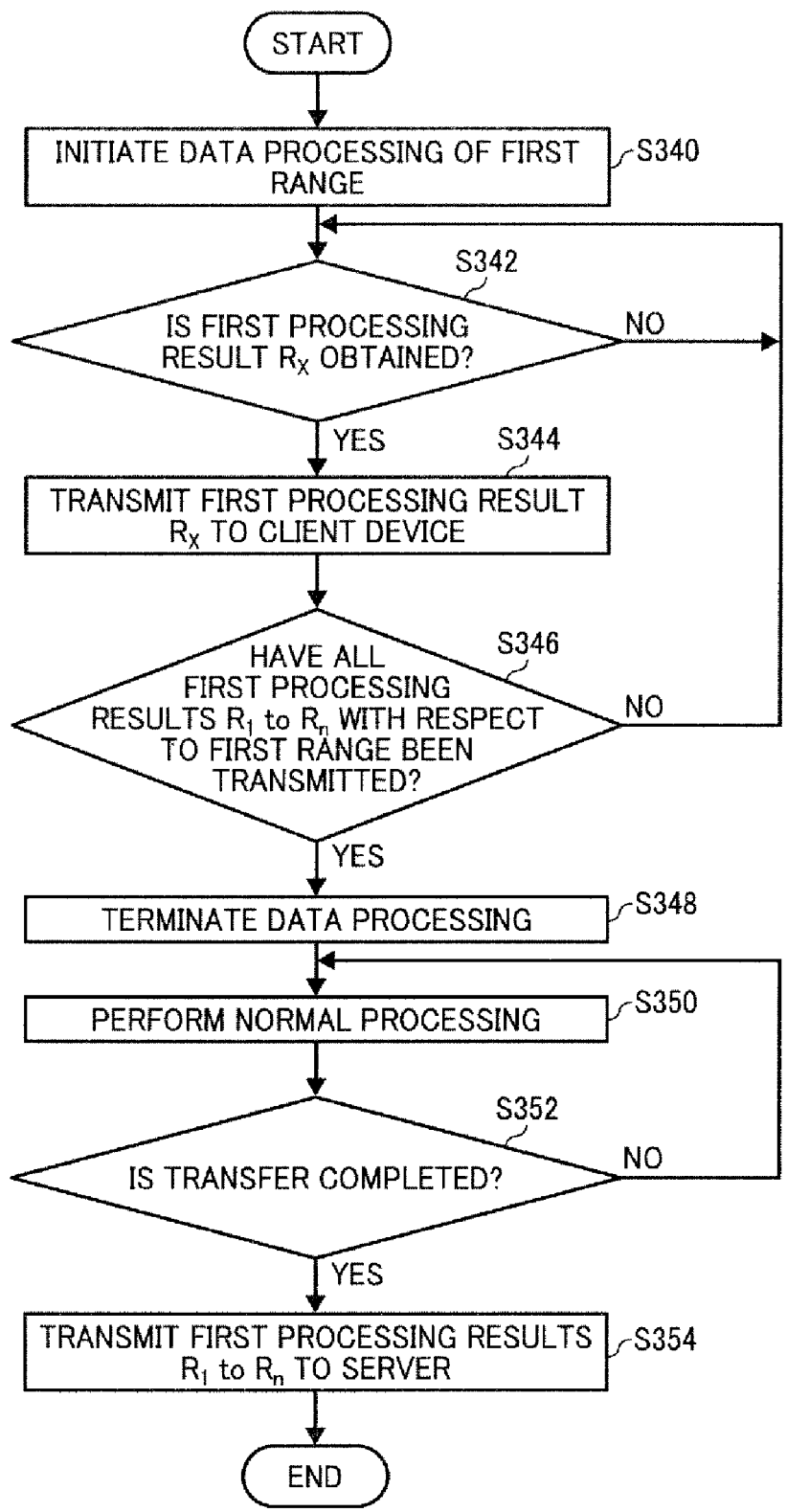
FIG. 16 is a flowchart illustrating a detailed procedure of a process performed by the relay device according to the second embodiment.

FIG. 16 is a flowchart illustrating a detailed procedure of the process performed by the relay device 22 according to the second embodiment. In the relay device 22, when the relay device 22 receives a request, the control unit 203 identifies a first range, and the data processing unit 206 initiates a process on the first range of processing object data (Step S340). Then, when a first processing result $R_X$ is obtained (YES at Step S342), the first processing result $R_X$ is transmitted to the client device 10 as a response (Step S344).

In the present embodiment, it never happens that the first processing result $R_X$ is already transmitted to the client device 10, so it is possible to eliminate a process of referencing the response table 208.

When all first processing results $R_1$ to $R_n$ with respect to the first range of the processing object data have been transmitted to the client device 10 (YES at Step S346), the data processing unit 206 terminates the process (Step S348). Since then, the relay device 22 performs normal processing (Step S350). When the transfer of all the responses to the client device 10 is completed (YES at Step S352), the first processing results $R_1$ to $R_n$ are transmitted to the server 30 (Step S354), and the process is completed.

In this manner, in the second embodiment, the relay device 22 and the server 30 each take charge of a process on a different range of processing object data from each other, so there is no overlap between respective processing results obtained by the two; therefore, it is possible to eliminate a process for coordination between the two.

Furthermore, in this case, a first processing result obtained by the relay device 22 is transmitted from the relay device 22 to the server 30 at an appropriate time, so the first processing result can be stored in the processing-result storage unit 306; therefore, the server 30 can manage all processing results.

Moreover, in the present embodiment, when a process on a first range is completed, if the relay device 22 does not yet receive a response from the server 30, the data processing unit 206 performs the process on a second range of processing object data. In this case, when the process on the first range is completed, the response management unit 207 writes "0" in the response table 208. Furthermore, when the process on the second range is initiated, the response management unit 207 records a byte length of the data, which has been returned as a response, in the response table 208.

Consequently, if a value has not been written in the response table 208, the control unit 203 can see that the process on the first range has not been terminated. Therefore, the control unit 203 waits for termination of the process. If a positive value has been written in the response table 208, the control unit 203 can delete a portion of a response received from the server 30 corresponding to the written value.

Incidentally, configurations and processes of other components in the relay system according to the second embodiment are identical to those in the relay system according to the first embodiment.

Figure 17:
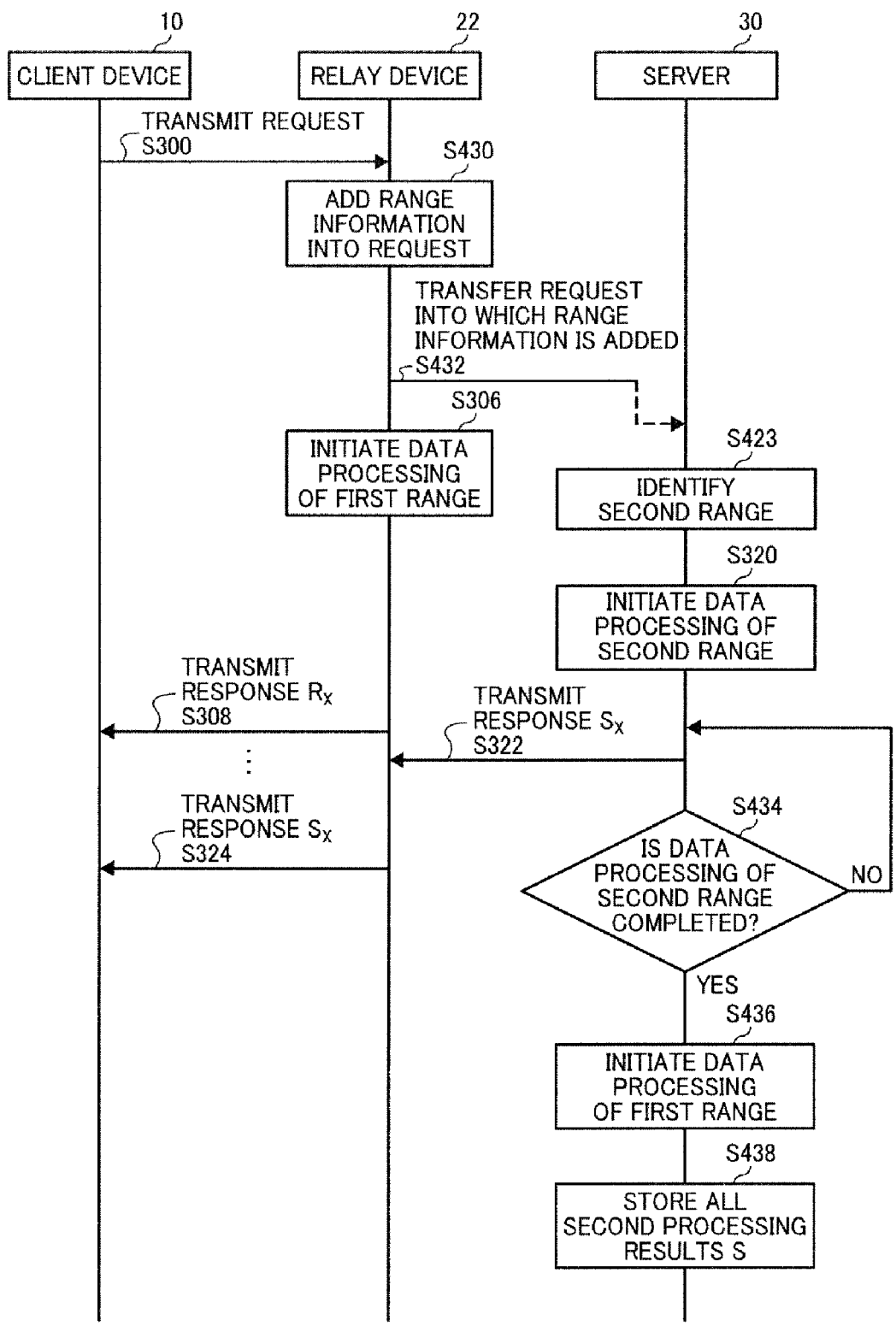
FIG. 17 is a communication sequence diagram illustrating a process according to a variation of the second embodiment.

As a variation of the relay device 22 according to the second embodiment, the relay device 22 can add range information indicating the first or second range into the request instead of deleting the first range of the processing object data, and transfer the request into which the range information is added. FIG. 17 is a communication sequence diagram illustrating a process according to the variation.

Figures 18, 19:
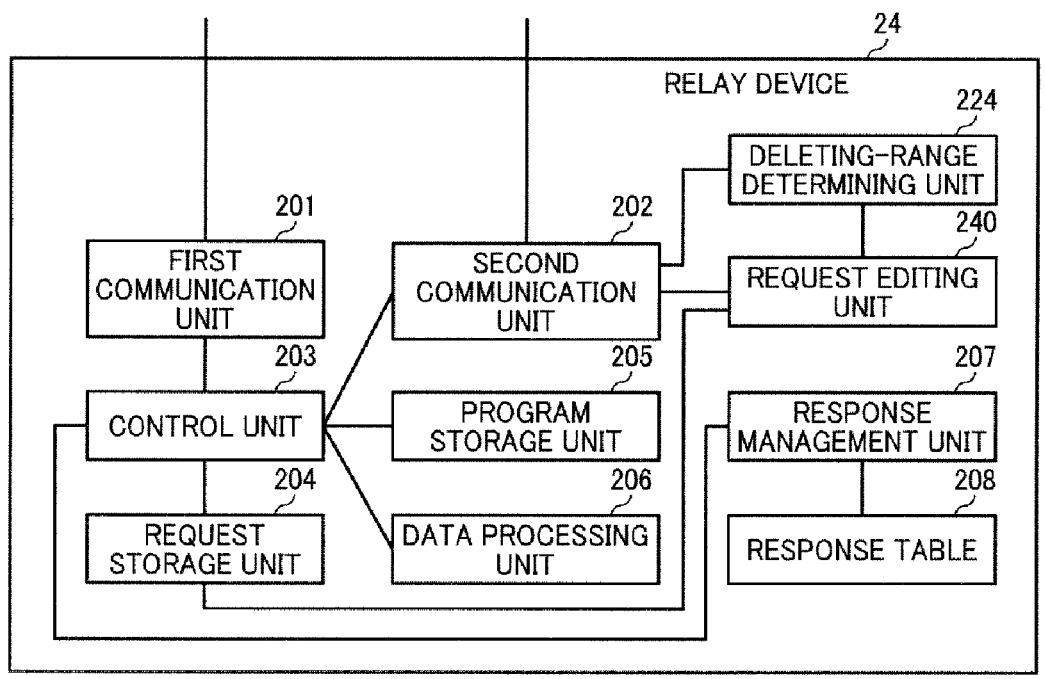
FIG. 18 is a diagram showing a request to be transmitted to the server.
FIG. 19 is a block diagram illustrating a functional configuration of a relay device according to a third embodiment.

In the variation, as shown in FIG. 17, when the first communication unit 201 of the relay device 22 receives a request (Step S300), the control unit 203 adds range information indicating a second range into the request (Step S430). Then, under the control of the control unit 203, the second communication unit 202 transmits the request into which the range information is added to the server 30 which is a destination (Step S432). FIG. 18 is a diagram showing the request to be transmitted to the server 30. In this manner, the request includes "2-10", which is information indicating the second range, in the "Expect header". Consequently, the server 30 can identify a range of the processing object data to be processed by the server 30.

Incidentally, another range information can be used as long as the server 30 can identify a range of processing object data by reference to the range information; for example, the range information can be information indicating the boundary between the first range and the second range. Furthermore, the range information can be described in a part of the data other than the header part. Moreover, the range information can be described in a part of the request other than data, such as the metadata part, as long as the range information is included in the request. Namely, the range information can be included, for example, in metadata of the request. Specifically, the range information can be included, for example, in the Expect header. Furthermore, the range information can be included in metadata of the request data. Specifically, the range information can be included, for example, in metadata of a tiff file used in the present embodiment. Moreover, the range information can be included in the request data. Specifically, the range information can be included in binary data of the tiff file. In this manner, the range information just has to be described in an area that the server 30 can identify.

When the server 30 receives the request (Step S432), first, the control unit 302 identifies the second range from the description in the request (Step S423). Then, the data processing unit 305 initiates a process on the second range of the processing object data (Step S320). The server 30 also obtains the first range of the processing object data. Therefore, when the data processing unit 305 completes the process on the second range of the processing object data (YES at Step S434), subsequently, the data processing unit 305 initiates the process on the first range of the processing object data (Step S436). Then, a second processing result S with respect to the whole processing object data, which is obtained by the data processing unit 305, is stored in the processing-result storage unit 306 (Step S438).

In this manner, in the present example, the server 30 can also obtain the first range of the processing object data, so it is possible to eliminate a process of obtaining the first processing result $R_X$ with respect to the first range of the processing object data from the relay device 22. Furthermore, in this manner, by performing the process on the first range of the processing object data after the process on the second range of the processing object data is completed, a waiting time for the client device 10 to receive a response can be further reduced.

Third Embodiment

Subsequently, a third embodiment is explained. A relay device 24 according to the third embodiment can dynamically determine a first range. FIG. 19 is a block diagram illustrating a configuration of the relay device 24 according to the third embodiment. The relay device 24 includes the first communication unit 201, the second communication unit 202, the control unit 203, the request storage unit 204, the program storage unit 205, the data processing unit 206, the response management unit 207, a deleting-range determining unit 224, a request editing unit 240, and the response table 208. The first communication unit 201, the second communication unit 202, the request storage unit 204, the program storage unit 205, the data processing unit 206, the response management unit 207, and the response table 208 included in the relay device 24 are identical to those in the relay device 20 for the first embodiment.

The deleting-range determining unit 224 determines a range to be deleted from processing object data in a request, i.e., a first range, on the basis of the current line status or processing load. Specifically, with a reference state set as 1, a value indicating a difference between a current state and the reference state is calculated. The reference state includes, for example, a normal state, a state in which respective loads on the relay device 24 and the server 30 are both zero, and the like. In the calculation of the difference, as variables, a transfer rate, a current load on the relay device 24, and a current load on the server 30 are used. The deleting-range determining unit 224 measures current three variables, calculates a value indicating a difference on the basis of the variables, and determines a first range on the basis of the difference.

For example, a transfer-rate identifying unit for calculating a transfer rate from the relay device 24 to the server 30 is provided to the relay device 24. Furthermore, 10% of processing object data in the reference state is set as a first range. When the relay device 24 receives a request from the client device 10, the transfer-rate identifying unit calculates a transfer rate of the request from the relay device 24 to the server 30, and if the transfer rate is down by half its normal rate due to a trouble with the line, the deleting-range determining unit 224 multiplies 10% by 2, and sets 20% of processing object data as a first range. In this manner, an amount of sharing of data processing of the relay device 24 can be dynamically determined depending on the environment.

In a case where a processing load is used for determining a first range, a load calculating unit for calculating a processing load on the relay device 20, such as a CPU utilization rate, is provided to the relay device 24. When the relay device 20 receives a request from the client device 10, the load calculating unit calculates the processing load. Then, depending on a value of the processing load, for example, if the processing load is twice as heavy as normal, the deleting-range determining unit 224 divides 10% by 2, and sets 5% of processing object data as a first range.

Alternatively, a processing load on the side of the server 30 can be used for determining a first range. For example, it can be configured that a server-load receiving unit for receiving the processing capability of the server 30, such as a CPU utilization rate, from the server 30 is provided to the relay device 24; when the relay device 20 receives a request from the client device 10, the server-load receiving unit identifies the processing load on the server 30; for example, if the processing load on the server 30 is doubled, the deleting-range determining unit 224 multiplies 10% by 2, and sets 20% of processing object data as a first range.

Further, the deleting-range determining unit 224 can be configured to determine a first range on the basis of the processing capability of the relay device 20, such as a CPU clock frequency of the relay device 20, and the processing capability of the server 30, such as a CPU clock frequency of the server 30.

The request editing unit 240 according to the present embodiment deletes the first range determined by the deleting-range determining unit 224 from the processing object data included in the request received by the first communication unit 201, and temporarily stores the request from which the first range is deleted in the request storage unit 204.

Figure 20:
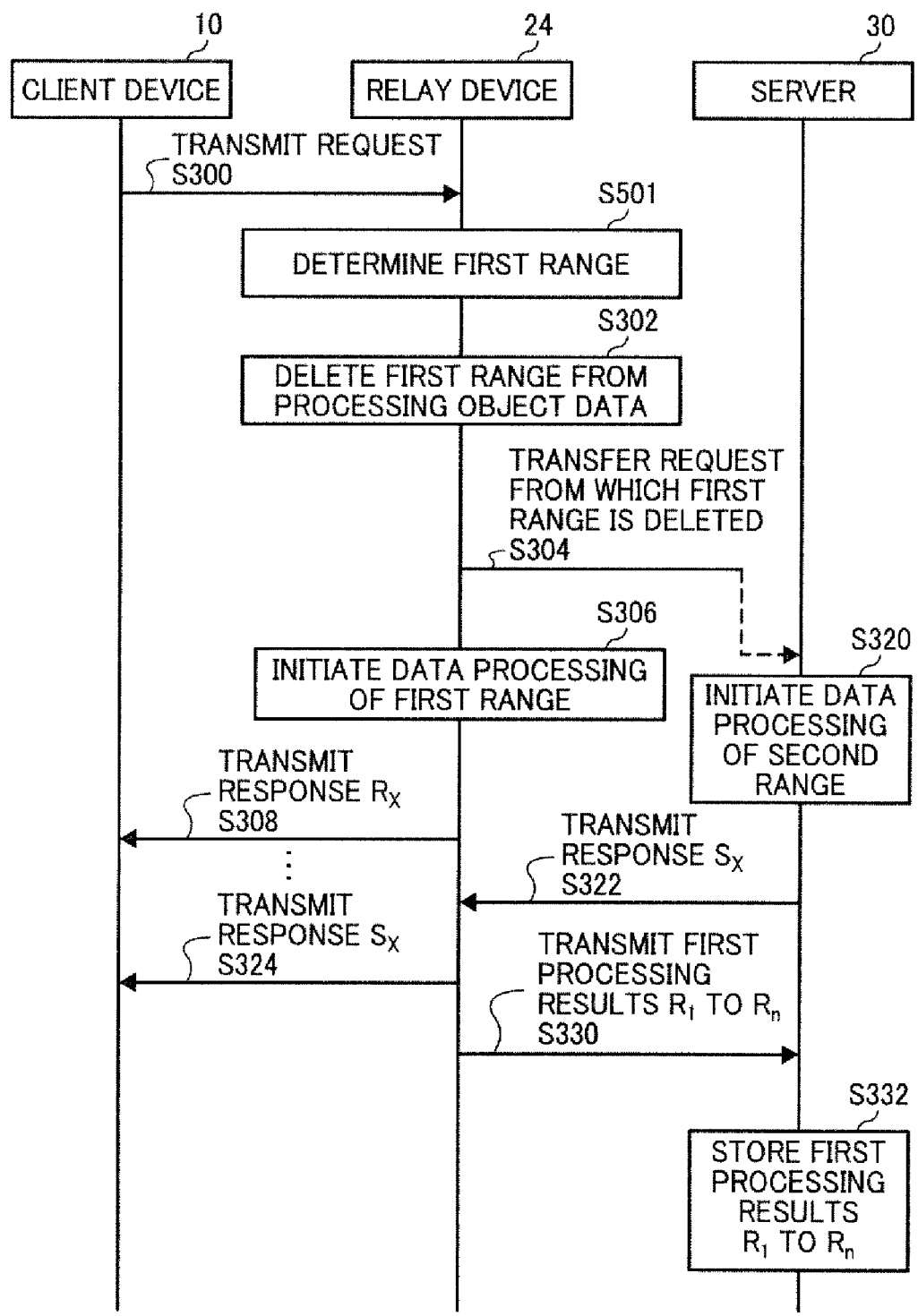
FIG. 20 is a communication sequence diagram illustrating a process according to the third embodiment.

FIG. 20 is a communication sequence diagram illustrating a process according to the third embodiment. When the client device 10 transmits a request (Step S300), the first communication unit 201 of the relay device 24 receives the request from the client device 10.

Then, the deleting-range determining unit 224 of the relay device 24 evaluates the current line status or processing capability, etc., and determines a first range to be deleted from processing object data in the request in the way described above (Step S501). Then, the request editing unit 240 deletes the first range determined by the deleting-range determining unit 224 from the processing object data included in the received request (Step S302). Subsequent steps (Steps S304 to S332) are identical to those described with reference to FIG. 15 for the second embodiment, and the description of these steps is omitted.

In this manner, in the present embodiment, a first range to be deleted from processing object data is dynamically set on the basis of the current line status, so the first range can be dynamically set to an appropriate range depending on a network status; therefore, a waiting time for the client device 10 to receive a response to the request can be further reduced as compared with a case where the client device 10 receives a response from the server 30 only.

In the third embodiment, the deleting-range determining unit 224 is configured to determine a first range on the basis of the current line status; however, it is not limited to this.

As a variation, the deleting-range determining unit 224 can determine a first range by learning of results that have previously been transferred.

Assuming that the deleting-range determining unit 224 has determined 15% of processing object data as a first range in the previous process, while the data processing unit 206 of the relay device 24 processes the first range of processing object data, the relay device 24 receives a second processing result with respect to a second range of the processing object data from the server 30. In this case, it can be seen that an amount of sharing of data processing of the relay device 24 is too many, so the first range is changed from 15% to a smaller amount, such as 10%. Namely, the deleting-range determining unit 224 determines the first range on the basis of a time at which the relay device 24 has received a previous second processing result $S_{X'}$. In this manner, by learning with a general supervised learning model, the first range can be optimized.

The server according to the present embodiments includes a control unit such as a CPU, a storage unit such as a read-only memory (ROM) or a random access memory (RAM), an external storage unit such as an HDD or a CD drive device, a display unit such as a display device, and an input unit such as a keyboard and a mouse, and has a hardware configuration using an average computer.

Furthermore, the relay device according to the present embodiments has a hardware configuration including a control unit such as a CPU, a storage unit such as a ROM or a RAM, an external storage unit such as an HDD or a CD drive device, a display unit such as a liquid crystal display panel, an input unit, and the like.

Respective programs executed by the relay device and the server according to the present embodiments are provided in such a manner that each program is recorded on a computer-readable recording medium, such as a CD-ROM, a flexible disk (FD), a CD-R, or a digital versatile disk (DVD), in an installable or executable file format.

Furthermore, the program executed by the relay device or the server according to the present embodiments can be stored on a computer connected to a network, such as the Internet, so that the program can be provided by causing a user to download the program over the network. Moreover, the program executed by the relay device or the server according to the present embodiments can be provided or distributed via a network, such as the Internet. Furthermore, the program according to the present embodiments can be incorporated in a ROM or the like in advance and provided.

The program executed by the relay device or the server according to the present embodiments is composed of modules including the units described above. The CPU (a processor), actual hardware, reads out the program from the storage unit, and executes the program, whereby the above units are loaded on a main memory unit, and the units are generated on the main memory unit.

According to the present invention, it is possible to enhance the response speed of data processing using a network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A relay device that is connected to a client device and a server via a network and functions as a relay between the client device and the server, the relay device comprising:
a first communication unit that receives, from the client device via the network, a request including processing object data to be processed and destination information indicating the server;
a data processing unit that obtains a first processing result by performing a relay-device-side process of equivalent algorithm to that of a server-side process, on the processing object data, the server-side process being performed on the processing object data by the server;
a second communication unit that transmits the request to the server, and receives a second processing result from the server as a response to the request, the second processing result corresponding to the first processing result and being obtained by performance of the server-side process on the processing object data; and
a control unit that determines whether the second processing result has been transmitted to the client device, wherein
when it is determined that the second processing result has not been transmitted to the client device, the first communication unit transmits the first processing result of the relay-device-side process performed on the processing object data by the data processing unit of the relay device, as the response to the client device.

2. The relay device according to claim 1, the data processing unit performs the relay-device-side process on the processing object data in a different processing unit from that of the server-side process.

3. The relay device according to claim 1, further comprising a program storage unit that stores therein a relay-device-side program which is the same in process order as a server-side program for causing the server to perform the server-side process and finally produces the same output as the server-side program, wherein
the data processing unit executes the relay-device-side program to thereby perform the relay-device side process on the processing object data.

4. The relay device according to claim 1, further comprising:
a table storage unit that stores therein a response table; and
a response management unit that registers request identifying information for identifying the request and first-processing-result identifying information for identifying the first processing result obtained by the data processing unit in the response table in an associated manner when the first processing result is obtained, and registers the request identifying information and second-processing-result identifying information for identifying the second processing result in the response table in an associated manner when the second processing result from the server is received, wherein
the control unit determines whether the second-processing-result identifying information of the second processing result corresponding to the first processing result has been registered in the response table by reference to the response table, and
the first communication unit transmits the first processing result to the client device as the response when it is determined that the second-processing-result identifying information has not been registered in the response table.

5. The relay device according to claim 1, wherein
the control unit deletes the first processing result when it is determined that the second processing result corresponding to the first processing result has already been transmitted to the client device, and
the data processing unit terminates the relay-device-side process on the processing object data.

6. The relay device according to claim 1, wherein
the control unit determines whether the first processing result corresponding to the second processing result has already been transmitted to the client device when the second processing result with respect to the processing object data is received from the server as the response, and
the first communication unit transmits the second processing result to the client device as the response when it is determined that the first processing result has not been transmitted to the client device.

7. The relay device according to claim 6, further comprising:
a table storage unit that stores therein a response table; and
a response management unit that registers request identifying information for identifying the request and first-processing-result identifying information for identifying the first processing result obtained by the data processing unit in the response table in an associated manner when the first processing result is obtained, and registers the request identifying information and second-processing-result identifying information for identifying the second processing result in the response table in an associated manner when the second processing result from the server is received, wherein
the control unit determines whether the first-processing-result identifying information of the first processing result corresponding to the second processing result has been registered in the response table by reference to the response table, and
the first communication unit transmits the second processing result to the client device as the response when it is determined that the first-processing-result identifying information of the first processing result has not been registered in the response table.

8. The relay device according to claim 6, wherein the control unit deletes the second processing result when it is determined that the first processing result corresponding to the second processing result has already been transmitted to the client device.

9. The relay device according to claim 1, wherein
the data processing unit performs the relay-device-side process on a predetermined first range of the processing object data, and
the first communication unit transmits a first processing result with respect to the first range of the processing object data, which is obtained by performance of the relay-device-side process, to the client device as a response to the request.

10. The relay device according to claim 9, wherein
the second communication unit receives a second processing result obtained by performance of the server-side process on a second range of the processing object data, which is a range of the processing object data other than the first range, from the server, and
the first communication unit transmits the second processing result with respect to the second range of the processing object data to the client device as the response.

11. The relay device according to claim 9, further comprising an editing unit that deletes the first range from the processing object data included in the request received by the first communication unit, wherein
the second communication unit transmits the request including the processing object data from which the first range is deleted to the server.

12. The relay device according to claim 9, further comprising an editing unit that adds range information indicating the first range into the processing object data included in the request, wherein
the second communication unit transmits the request including the range information to the server.

13. The relay device according to claim 9, further comprising a range determining unit that determines the first range on the basis of a line status from the relay device to the server, wherein
the data processing unit performs the relay-device-side process on the first range of the processing object data determined by the range determining unit.

14. The relay device according to claim 9, further comprising a range determining unit that determines the first range on the basis of a processing load on the relay device, wherein
the data processing unit performs the relay-device-side process on the first range of the processing object data determined by the range determining unit.

15. The relay device according to claim 9, further comprising a range determining unit that determines the first range on the basis of a processing load on the server, wherein the data processing unit performs the relay-device-side process on the first range of the processing object data determined by the range determining unit.

16. The relay device according to claim 10, further comprising a range determining unit that determines, when the first communication unit receives the request, the first range on the basis of a first range used by the data processing unit when a previous request has been received and a time at which the second processing result from the server is received, wherein the data processing unit performs the relay-device-side process on the first range of the processing object data determined by the range determining unit.

17. The relay device according to claim 11, wherein the second communication unit further transmits the first processing result to the server.

18. A method performed by a relay device that is connected to a client device and a server via a network and functions as a relay between the client device and the server, the method comprising:

receiving, from the client device via the network, a request including processing object data to be processed and destination information indicating the server;

obtaining a first processing result by the relay device performing a relay-device-side process of equivalent algorithm to that of a server-side process, on the processing object data, the server-side process being performed on the processing object data by the server;

transmitting the request to the server and receiving a second processing result from the server as a response to the request, the second processing result corresponding to the first processing result and being obtained by performance of the server-side process on the processing object data;

determining whether the second processing result has been transmitted to the client device; and transmitting the first processing result of the relay-device-side process performed by the relay device on the processing object data, as the response to the client device, when it is determined that the second processing result from the server has not been transmitted to the client device.

19. A computer program product comprising a non-transitory computer-usable medium containing computer-readable program codes that is executed by a computer, which is connected to a client device and a server via a network and functions as a relay between the client device and the server, the program codes when executed causing the computer to perform:

receiving, from the client device via the network, a request including processing object data to be processed and destination information indicating the server;

obtaining a first processing result by performing a relay-device-side process of equivalent algorithm to that of a server-side process on the processing object data, the server-side process being performed on the processing object data by the server;

transmitting the request to the server and receiving a second processing result from the server as a response to the request, the second processing result corresponding to the first processing result and being obtained by performance of the server-side process on the processing object data;

determining whether the second processing result has been transmitted to the client device; and transmitting the first processing result to the client device as the response when it is determined that the second processing result has not been transmitted to the client device.

20. The relay device according to claim 1, wherein the first processing result of the relay-device-side process performed on the processing object data by the relay device is same as the second processing result of the server-side process performed on the processing object data by the server.

* * * * *